United States Patent
Nishibori (10) Patent No.: US 8,599,583 B2
(45) Date of Patent: Dec. 3, 2013

(54) AC POWER SUPPLY CIRCUIT WITH FILTER CAPACITOR BETWEEN OUTPUT TERMINALS THEREOF

(75) Inventor: Kohei Nishibori, Nagano (JP)

(73) Assignee: Minebea Co., Ltd., Nagano (JP)

( * ) Notice: Subject to any disclaimer, the term of this patent is extended or adjusted under 35 U.S.C. 154(b) by 177 days.

(21) Appl. No.: 13/365,589

(22) Filed: Feb. 3, 2012

(65) Prior Publication Data
US 2012/0201067 A1    Aug. 9, 2012

(30) Foreign Application Priority Data
Feb. 7, 2011    (JP) ................................. 2011-023768

(51) Int. Cl.
*H02J 3/00* (2006.01)
*H02M 7/217* (2006.01)

(52) U.S. Cl.
USPC .............................. 363/34; 363/123; 363/127

(58) Field of Classification Search
USPC ........................................... 363/34, 123, 127
See application file for complete search history.

(56) References Cited

U.S. PATENT DOCUMENTS

| 4,146,291 | A  | * | 3/1979 | Goff et al. ....................... 439/90 |
| 6,703,793 | B2 | * | 3/2004 | Kitano .......................... 315/224 |
| 7,254,005 | B2 | * | 8/2007 | Oyama .......................... 361/220 |

FOREIGN PATENT DOCUMENTS

| JP | 2001-095261 A | 4/2001 |
| JP | 2006-204028 A | 8/2006 |
| JP | 2010-004613 A | 1/2010 |

* cited by examiner

*Primary Examiner* — Adolf Berhane
*Assistant Examiner* — Emily P Pham
(74) *Attorney, Agent, or Firm* — Carrier Blackman & Associates, P.C.; Joseph P. Carrier; William D. Blackman (57) ABSTRACT

A power supply circuit includes, an input part, which has a first input terminal and a second input terminal, and which is configured to connect to an alternating current power supply; a line capacitor that is connected to the first input terminal and the second input terminal; a rectification circuit, which is connected to the first input terminal and the second input terminal, which rectifies and outputs to a load circuit from a high voltage side output terminal and a low voltage side output terminal; a smoothing capacitor, which is connected between the high voltage side output terminal and the low voltage side output terminal, and a remaining charge discharge unit that, when the alternating current flowing is interrupted, detects the interruption and discharges electrical charges remaining in the line capacitor, based on electrical charges of the high voltage side output terminal or charges of the smoothing capacitor.

7 Claims, 9 Drawing Sheets

FIG. 9
BACK GROUND ART

US 8,599,583 B2

AC POWER SUPPLY CIRCUIT WITH FILTER CAPACITOR BETWEEN OUTPUT TERMINALS THEREOF

CROSS-REFERENCE TO RELATED APPLICATION

This application claims priority from Japanese Patent Application No. 2011-023768 filed on Feb. 7, 2011, the entire subject matter of which is incorporated herein by reference.

TECHNICAL FIELD

This disclosure relates to a power supply circuit, and more specifically, to a power supply circuit having a filter capacitor used for a line filter arranged between two output terminals of an alternating current power supply (across-the-line capacitor).

BACKGROUND

For example, in a power supply circuit that is provided to a power supply apparatus for an electronic device such as AC-DC converter that converts a voltage from a commercial alternating current voltage to a direct current voltage, an input part alternating current (hereinafter, also referred to as AC) power is provided with a variety of filter circuits (line filters). The filter circuit is provided so as to suppress a noise from being leaked or introduced through a wiring. The filter circuit may include a filter capacitor that is arranged between an L pole and an N pole of AC lines connected to an AC power supply (across-the-line capacitor). The filter capacitor has an effect of suppressing noises of the AC lines.

In the power supply circuit having the filter capacitor, when an input path of the AC is interrupted at a forward end position (a portion close to an output terminal side of the AC power supply) more than the filter capacitor, charges corresponding to a capacity of the filter capacitor remain in the filter capacitor, i.e., between both poles of the AC. For example, when an AC plug of the electronic device and the like is pulled out from a plug socket and thus interrupts the input path of the AC, a remaining voltage accompanied by the remaining charges occurs between both electrodes of the AC plug.

In order to suppress the user from getting an electric shock, it is necessary to remove the remaining charges. Regarding the remaining charges, a variety of reference values is defined in the standards and the like. For example, IEC60065-9.1.6 defines a remaining voltage value after 2 seconds from the interruption of the AC. Also, IEC60950-2.1.1.7 defines a time constant (1 second or below) of remaining voltage decay.

By using a below-described method, the remaining charges between both poles of the AC are removed to decay the remaining voltage, the power supply circuit to satisfy the reference values and to be suitable for the standards and the like is provided. That is, regarding the method of removing the remaining charges, a so-called discharge resistance method, an IC method, a circuit method and the like are adopted.

Figure 9:
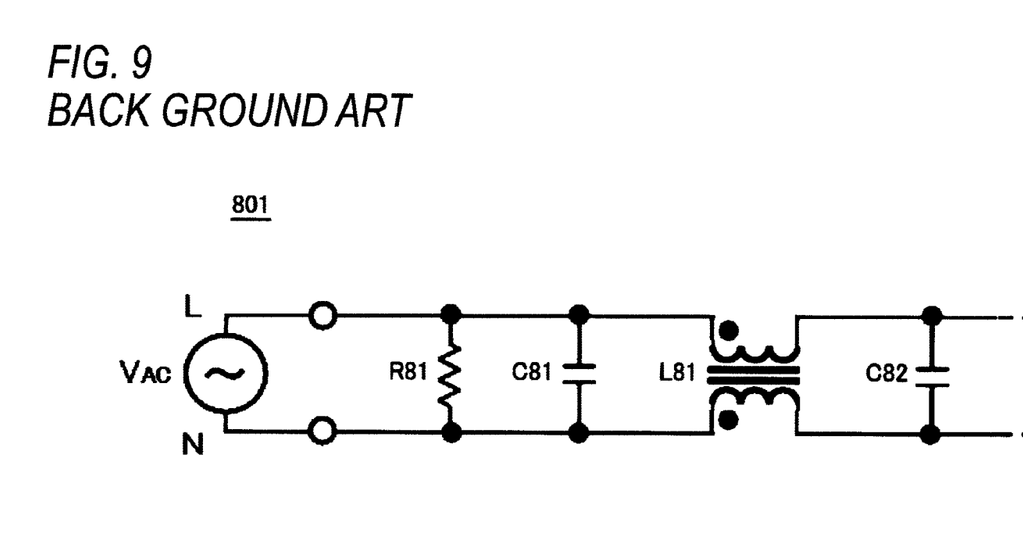
FIG. 9 is a circuit diagram illustrating an example of a power supply circuit adopting a discharge resistance method.

FIG. 9 is a circuit diagram illustrating an example of a power supply circuit adopting the discharge resistance method.

FIG. 9 shows a power supply circuit 801, in which the discharge resistance method is adopted. The circuit is an AC-DC converter having an AC power supply $V_{AC}$, a resistance R81, capacitors C81, C82 and a coil L81. Both ends of the filter capacitor C81 are respectively connected to two output terminals (L pole, N pole) of the AC power supply $V_{AC}$.

The resistance R81 is connected in parallel with the filter capacitor C81 at a part closer to the output terminals of the AC power supply $V_{AC}$ than the filter capacitor C81. When interrupting the AC, charges of the filter capacitor C81 flow to the resistance R81. Accordingly, when interrupting the AC, the charges of the filter capacitor C81 are removed. The discharge resistance method has merits in that it is realized at low cost and the power supply circuit 801 has a simple configuration.

In the meantime, according to the IC method, a discharge circuit to discharge the remaining charges is integrated and provided to a power supply circuit. In the IC method, since it is possible to make the discharge circuit small, it is possible to miniaturize the power supply circuit or an apparatus having the same mounted thereto.

The circuit method is described as follows.

That is, JP-A-2001-095261 and JP-A-2010-004613 disclose technologies about configurations or controls of suppressing current from flowing between the L pole and the N pole of the AC lines through the discharge resistance when AC is input, i.e., when the power supply circuit operates. Both JP-A-2001-095261 and JP-A-2010-004613 discloses a circuit configuration, in which a discharge path of the remaining charges when interrupting the input path of the AC is provided between the different poles (L pole and N pole) of the AC lines.

JP-A-2006-204028 discloses a direct current power supply apparatus, in which a path at a low voltage side after rectification is configured as the path of discharging the remaining charges when interrupting the AC input path.

SUMMARY

However, the discharge resistance method and the IC method have problems, respectively.

In the discharge resistance method, operation efficiency (power conversion efficiency) of the power supply circuit is relatively low. That is, when the power supply circuit operates, the current, which does not contribute to a purpose of power conversion, flows between the L pole and the N pole of the AC lines through the discharge resistance.

Also, in the IC method, since the relatively expensive IC is used, a manufacturing cost of the power supply circuit or apparatus having the power supply circuit mounted thereto is high.

On the other hand, the circuit methods disclosed in JP-A-2001-095261, JP-A-2010-004613 and JP-A-2006-204028, solves the problem of the discharge resistance method by using a cheaper circuit, compared to the IC method. In other words. It may be realized that the operation efficiency is relatively higher by the circuit method and the power supply circuit has the lower manufacturing cost compared to the IC method. However, there are following problems.

In case that the discharge circuit disclosed in JP-A-2001-095261 and JP-A-2010-004613 is provided between the different poles of the AC lines, it may be necessary to increase an anti-surge current capability or anti-surge voltage capability of a circuit part so as to be sufficiently robust to surge current or surge voltage, or it may be necessary to add another surge suppressing part. As a result, the manufacturing cost of the power supply circuit is increased.

Also, according to the method of JP-A-2010-004613, in which a switch is provided to one of the AC lines to interrupt the input path of the AC, the discharge circuit may malfunction and thus the discharge may not start. That is, when one of two input paths of the AC is interrupted, the current of the AC line may be introduced into a circuit for detecting the interruption of the AC through the other input path of the AC that is not interrupted. The line current may be introduced via a line bypass capacitor, and the like provided between a primary circuit and a secondary circuit of the power supply apparatus.

In the power supply circuit disclosed in JP-A-2006-204028, it is necessary to provide a diode to the high voltage side line of outputs of a bridge diode that is a rectification circuit. This is to exclude an electrolytic capacitor between high voltage side and low voltage side lines of the outputs of the bridge diode from a discharge object while discharging the remaining charges of the across-the-line capacitor to the low voltage side after rectification, when interrupting the AC. At this time, with respect to the diode that is to be provided, it is necessary to use a high-priced diode having a high withstand voltage capability, so that the manufacturing cost of the power supply circuit is increased.

Meanwhile, in the power supply circuit disclosed in JP-A-2006-204028, it may be discharged the remaining charges of the electrolytic capacitor without providing the diode. In this case, however, since it is necessary to increase the current capacity of a circuit device used as a discharge unit, the manufacturing cost of the power supply circuit is also increased.

Further, in recent years, regarding a method of improving efficiency of the power supply circuit, a rectification method, in which a bridge diode is not provided, has been suggested. When the rectification method is adopted, the conventional problems are noticeable. That is, in the rectification method, a capacitor having a relatively large capacity is used as the filter capacitor so as to enhance the noise suppression capability. In this case, since the charges accumulated in the filter capacitor are increased, it is necessary to reduce a resistance value of a discharge resistance for discharging the remaining charges, so as to make the remaining voltage value or time constant of the remaining voltage decay become the prescribed value. Therefore, when the AC is input, i.e., when the power supply circuit normally operates, the current flowing between the AC lines through the discharge resistance is increased, so that the operation efficiency of the power supply circuit is lowered.

With considering above, this disclosure provides a power supply circuit having high operation efficiency, capable of securely starting to discharge remaining charges and having a low manufacturing cost.

In view of the above, a power supply circuit of this disclosure comprises: an input part, which has a first input terminal and a second input terminal, and which is configured to connect to an alternating current power supply; a line capacitor that is connected to the first input terminal and the second input terminal in parallel with the alternating current power supply; a rectification circuit, which is connected to the first input terminal and the second input terminal, which rectifies alternating current of the alternating current power supply and outputs to a load circuit from a high voltage side output terminal and a low voltage side output terminal; a smoothing capacitor, which is connected between the high voltage side output terminal and the low voltage side output terminal, which charges electrical charges output from the rectification circuit, and which discharges the electrical charges to the load circuit; and a remaining charge discharge unit that, when the alternating current flowing to the rectification circuit is interrupted in one of the first input terminal and the second input terminal, detects the interruption and discharges electrical charges remaining in the line capacitor to the low voltage side output terminal from the other one of the first input terminal and the second input terminal, which is different from the interrupted output terminal, based on charges of the high voltage side output terminal or electrical charges of the smoothing capacitor.

In the above-described power supply circuit, the remaining charge discharge unit may comprise: a detection unit, which is connected between the first and second input terminals and the low voltage side line, and which detects the interruption; a discharge unit, which is connected between the first and second input terminals and the low voltage side line; a charge unit, which supplies a driving voltage from the high voltage side output terminal to the discharge unit; and a discharge control unit, which controls the supply of the driving voltage by the charge unit, based on a detection result of the interruption by the detection unit, and wherein the discharge unit, which discharges the electrical charges remaining in the line capacitor, based on the driving voltage supplied from the charge unit.

In the above-described power supply circuit, the power supply circuit, wherein the detection unit may comprise: a first detection unit, which is connected between the first input terminal and the low voltage side line, and which detects the interruption in the first input terminal based on a potential of the low voltage side line; and a second detection unit, which is connected between the second input terminal and the low voltage side line, and which detects the interruption in the second input terminal based on a potential of the low voltage side line, wherein the discharge control unit may comprise: a first switching device that has a control terminal connected to the first detection unit and becomes on or off state, depending on the detection result of the interruption in the first input terminal by the detection unit; and a second switching device that has a control terminal connected to the second detection unit and becomes on or off state, depending on the detection result of the interruption in the second input terminal by the detection unit, wherein when both the first switching device and the second switching device are under on-state, the supply of the driving voltage from the charge unit to the discharge unit is stopped, and wherein when one or both the first switching device and the second switching device are off-state, the driving voltage may be supplied from the charge unit to the discharge unit.

In the above-described power supply circuit, the discharge unit may have a first discharge unit that is connected between the second input terminal and the low voltage side line and a second discharge unit that is connected between the first input terminal and the low voltage side line, wherein one terminal of output terminals of the first switching device may be connected to a driving voltage supply terminal of the first discharge unit, wherein one terminal of output terminals of the second switching device may be connected to a driving voltage supply terminal of the second discharge unit, wherein the first discharge unit may discharge the electrical charges remaining in the line capacitor from the second input terminal when the driving voltage is supplied from the charge unit to the driving voltage supply terminal of the first discharge unit depending on an operation of the first switching device, and wherein the second discharge unit may discharge the electrical charges remaining in the line capacitor from the first input terminal when the driving voltage is supplied from the charge unit to the driving voltage supply terminal of the second discharge unit depending on an operation of switching device.

In the above-described power supply circuit, the discharge unit may include: a discharge synthesis unit, which is connected to the first input terminal and the second input terminal, and which connects a path from the first input terminal and a path from the second input terminal; and a third discharge unit, which is connected between the discharge synthesis unit and the low voltage side line, and wherein the third discharge unit may discharge the electrical charges remaining in the line capacitor from the first and second input terminals, in which the alternating current is not interrupted, through the discharge synthesis unit when the driving voltage is supplied to a driving voltage supply terminal of the third discharge unit from the charge unit as the first switch or second switch operates.

In the above-described power supply circuit, one terminal of output terminals of the first switching device and one terminal of output terminals of the second switching device may be connected to each other at a connection part, and wherein the connection part may be connected to the driving voltage supply terminal of the third discharge unit.

In the above-described power supply circuit, the first switching device and the second switching device may be connected to each other in series, and wherein one terminal of output terminals of one of the first switching device and the second switching device may be connected to the driving voltage supply terminal of the third discharge unit.

According to this disclosure, when the alternating current is interrupted in one of the first input terminal and the second input terminal, the remaining charge discharge unit discharges the charges remaining in the line capacitor from the input terminal different from the input terminal, at which the interruption is detected, to the low voltage side output terminal. Accordingly, it is possible to provide the power supply circuit having high operation efficiency and low manufacturing cost.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, illustrative embodiments of this disclosure will be described with reference to the drawings.

A power supply circuit is an AC-DC converter, for example. A filter capacitor (across-the-line capacitor) is provided between two output terminals (between two lines) of an AC power supply. The filter capacitor is used as a line filter. The power supply circuit has a remaining charge discharge unit. The remaining charge discharge unit is a circuit that detects interruption of AC if the AC is interrupted and discharges a voltage remaining in the filter capacitor. The remaining charge discharge unit rapidly lowers the voltage remaining in the filter capacitor, when the AC is interrupted. Thereby, it is possible to suppress a user from getting an electric shock.

The remaining charge discharge unit has a resistance that is connected between each of two lines of the AC and a low voltage side wiring after rectification. The remaining charge discharge unit can detect the interruption of the AC, based on a potential of the resistance part. The remaining charge discharge unit discharges the charges accumulated in the filter capacitor from a line opposite to the AC line, at which the interruption has been detected, toward the low voltage side wiring after rectification. The remaining charge discharge unit is configured to suppress power loss during the power supply circuit in the normal operation.

[First Illustrative Embodimen]

Figure 1:
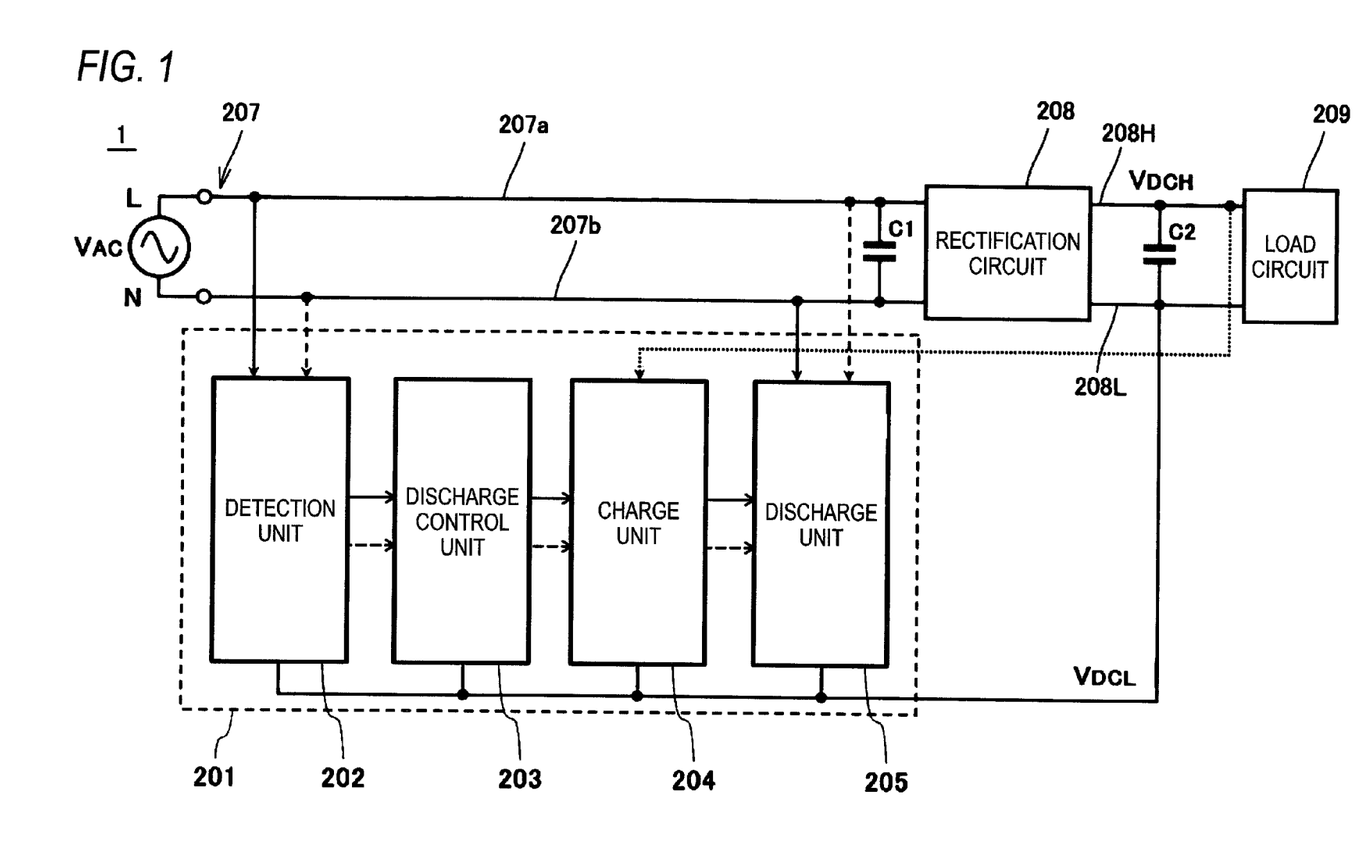
FIG. 1 is a circuit diagram illustrating a configuration of a power supply circuit according to a first illustrative embodiment of this disclosure.

FIG. 1 is a circuit diagram illustrating a configuration of a power supply circuit according to a first illustrative embodiment of this disclosure.

As shown in FIG. 1, a power supply circuit 1 is an AC-DC converter. The power supply circuit 1 has an input terminal 207 (which is an example of an input part), a filter capacitor C1, a rectification circuit 208, a smoothing capacitor C2 and a remaining charge discharge unit 201. The power supply circuit 1 is connected to an AC power supply $V_{AC}$ at the input terminal 207. The power supply circuit 1 feeds power that is rectified in the rectification circuit 208 to a load circuit 209.

The AC power supply $V_{AC}$ is a commercial alternating current power supply. The AC power supply $V_{AC}$ is configured to be used via a plug socket, for example. The AC power supply $V_{AC}$ has two output terminals of a first output terminal L and a second output terminal N. The first output terminal L is an L pole of the AC power supply $V_{AC}$. The second output terminal N is an N pole of the AC power supply $V_{AC}$.

The input terminal 207 is a commercial AC input terminal and is a plug that can be inserted into a plug socket, for example. The input terminal 207 is connected to the first output terminal L and the second output terminal N with being inserted into the plug socket of the AC power supply $V_{AC}$. Thereby, AC power is fed to the power supply circuit 1 from the AC power supply $V_{AC}$. The AC is input to the rectification circuit 208 via an AC line 207a connected to the first output terminal L and an AC line 207b connected to the second output terminal N.

In the meantime, a combination of the input terminal 207 and the AC power supply $V_{AC}$ is not limited to the plug and the plug socket. For example, the input terminal 207 may be a power supply switch and the power supply circuit 1 may be connected to the AC power supply $V_{AC}$ all the time. In this case, the feeding of the AC power to the power supply circuit 1 may be on or off in the input terminal 207.

The filter capacitor C1 (which is an example of a line capacitor) is an across-the-line capacitor. The filter capacitor C1 is provided at an input side of the rectification circuit 208. The filter capacitor C1 is connected in parallel with the AC power supply $V_{AC}$. That is, one end of the filter capacitor C1 is connected to the first output terminal L (AC line 207a) and the other end is connected to the second output terminal N (AC line 207b). The filter capacitor C1 suppresses noises of the AC lines 207a and 207b.

The rectification circuit 208 is connected at a more rearward position than the filter capacitor C1 from the AC power supply $V_{AC}$, i.e., a position distant from the AC power supply $V_{AC}$. The rectification circuit 208 rectifies the input AC, converts the same into a ripple voltage and outputs the ripple voltage. For example, the rectification circuit is a bridge-diode-less type. Regarding the filter capacitor C1, a capacitor having a large capacity may be selected so as to enhance the noise suppression capability of the filter capacitor C1. In the meantime, rectification circuit 208 may be configured by a bridge diode may be also used.

A high voltage side output terminal 208H of the rectification circuit 208 is connected to the load circuit 209 via a high voltage side line $V_{DCH}$. A low voltage side output terminal 208L of the rectification circuit 208 is connected to the load circuit 209 via a low voltage side line $V_{DCL}$.

The smoothing capacitor C2 is provided at an output side of the rectification circuit 208. One end of the smoothing capacitor C2 is connected to the high voltage side output terminal 208H and the other end is connected to the low voltage side output terminal 208L. The smoothing capacitor C2 smoothes the ripple voltage, which is output from the rectification circuit 208, to a constant voltage. The smoothing capacitor C2 charges the charges supplied from the rectification circuit 208 and discharges the charges to the load circuit 209. Thereby, the load circuit 209 is supplied with the smoothed voltage.

The remaining charge discharge unit 201 has a detection unit 202 (which is an example of a detection unit), a discharge control unit 203 (which is an example of a discharge control unit), a charge unit 204 and a discharge unit 205 (which is an example of a discharge unit).

The detection unit 202 is connected between the first output terminal L and second output terminal N and the low voltage side line $V_{DCL}$. The detection unit 202 detects interruption of the alternating currents of the AC lines 207a, 207b. The charge unit 204 supplies a driving voltage from the high voltage side output terminal 208H to the discharge unit 205. The discharge control unit 203 controls the supply of the driving voltage by the charge unit 204, in accordance with a detection result of the alternating current interruption by the detection unit 202. The discharge unit 205 is connected between the first output terminal L and second output terminal N and the low voltage side line $V_{DCL}$. The discharge unit 205 discharges the charges remaining in the filter capacitor C1, in accordance with the driving voltage supplied from the charge unit 204.

When the AC interruption occurs in one of the first output terminal L and the second output terminal N, i.e., the AC lines 207a or 207b, the remaining charge discharge unit 201 detects the interruption. The remaining charge discharge unit 201 discharges the remaining charges in the filter capacitor C1 from the AC line 207b or 207a, which is different from the AC line 207a, or 207b at which the interruption has been detected, to the low voltage side line $V_{DCL}$ at the rear end of the rectification circuit 208. For example, when the AC interruption is detected in the AC line 207a, the remaining charge discharge unit 201 discharges the remaining charges from the AC line 207b.

In FIG. 1, a solid line arrow indicates the operation of the remaining charge discharge unit 201, which is performed when the AC interruption occurs in the AC line 207a, and a broken line arrow indicates the operation of the remaining charge discharge unit 201, which is performed when the AC interruption occurs in the AC line 207b. The charge unit 204 is supplied with a voltage from the high voltage side output terminal 208H (refer to a dotted line arrow).

When the AC interruption occurs in the AC line 207a and the detection unit 202 detects the interruption, a signal is transmitted from the discharge control unit 203 to the charge unit 204 based on the detection result of the detection unit 202. When the signal is transmitted, the charge unit 204 supplies the voltage, which is supplied from the high voltage side output terminal 208H, to the discharge unit 205, as a driving voltage. When the driving voltage is supplied, the discharge unit 205 discharges the remaining charges in the filter capacitor C1 from the AC line 207b to the low voltage side line $V_{DCL}$.

In the meantime, the operation that is performed when the AC interruption occurs in the AC line 207b is also substantially the same as the above-described operation. That is, when the detection unit 202 detects the interruption, the discharge control unit 203 transmits a signal to the charge unit 204 and the charge unit 204 supplies a driving voltage to the discharge unit 205. When the driving voltage is supplied, the discharge unit 205 discharges the remaining charges in the filter capacitor C1 from the AC line 207a to the low voltage side line $V_{DCL}$.

[Circuit Configuration of Remaining Charge Discharge Unit 201]

Figure 2:
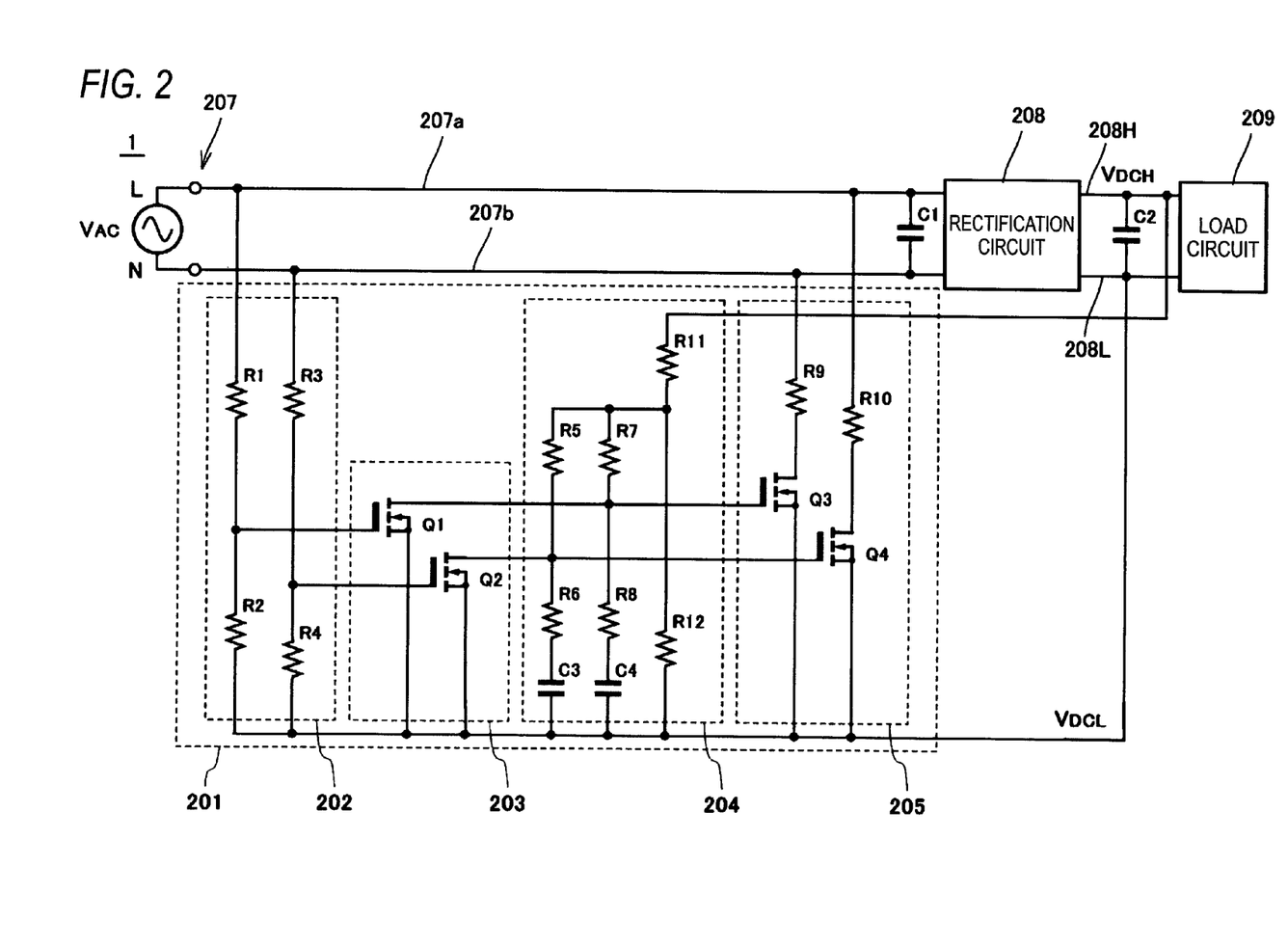
FIG. 2 is a circuit diagram illustrating a detailed configuration of the power supply circuit.

FIG. 2 is a circuit diagram illustrating a detailed configuration of the power supply circuit 1.

As shown in FIG. 2, the detection unit 202 has four resistances R1, R2, R3, R4. The resistances R1, R2 are connected to each other in series between the AC line 207a and the low voltage side line $V_{DCL}$. The resistance R1 is arranged to be closer to the AC line 207a than the resistance R2. The resistances R3, R4 are connected to each other in series between the AC line 207a and the low voltage side line $V_{DCL}$. The resistance R3 is arranged to be closer to the AC line 207a than the resistance R4.

The resistances R1, R2 configure a first detection unit, and detect the AC interruption in the AC line 207a, based on the potential of the low voltage side line $V_{DCL}$. The resistances R3, R4 configure a second detection unit, and detect the AC interruption in the AC line 207b, based on the potential of the low voltage side line $V_{DCL}$. That is, when the AC flows in the AC lines 207a, 207b, a potential of a part (connection point of the resistance R2 and the resistance R1 or connection point of the resistance R4 and the resistance R3) closer to the AC line 207a or 207b than the resistances R2, R4 is changed depending on a potential of the AC. However, when the AC is interrupted in one of the AC lines 207a, 207b, the potential of the part closer to the AC line 207a or 207b than the resistances R2, R4 becomes zero. In other words, each of the first detection unit and the second detection unit can output a detection signal indicating whether the interruption occurs. Accordingly, the detection unit 202 can detect the interruption.

In the meantime, as described below, the resistance R1 and the resistance R3 are provided depending on withstand voltage capabilities of a switching device Q1 and a switching device Q2. When a gate of the switching device Q1 or a gate of the switching device Q2 has a sufficient withstand voltage capability, the resistance R1 and the resistance R3 may not be provided, respectively.

The discharge control unit 203 has two switching devices Q1, Q2. Each of the switching devices Q1, Q2 is an enhancement-type N channel MOSFET (Metal-oxide-Semiconductor Field-Effect Transistor), for example. In the meantime, the switching devices Q1, Q2 are not limited to the MOSFET and may be the other field effect transistors or the other type transistors.

A control terminal (gate) of the switching device Q1 is connected between the resistance R1 and the resistance R2 of the detection unit 202. A control terminal of the switching device Q2 is connected between the resistance R3 and the resistance R4 of the detection unit 202. In this illustrative embodiment, when the AC flows in the AC lines 207a, 207b, potentials of the respective control terminals of the switching devices Q1, Q2 are changed depending on the AC. Therefore, the switching devices Q1, Q2 repeat the on or off operation. When the AC is interrupted in one of the AC lines 207a, 207b, the potential of the control terminal of the switching device Q1 or switching device Q2 corresponding to the interrupted AC line 207a, 207b becomes zero. Accordingly, the switching device Q1 or switching device Q2 becomes completely off. That is, the switching device Q1 repeats the on or off operation or becomes completely off, depending on the detection result of the interruption in the AC line 207a. Also, the switching device Q2 repeats the on or off operation or becomes completely off, depending on the detection result of the interruption in the AC line 207b. In other words, the switching device Q1 performs the on operation or off operation, depending on the detection signal output from the first detection unit. Also, the switching device Q2 performs the on operation or off operation, depending on the detection signal output from the first detection unit.

The discharge unit 205 has two resistances R9, R10 and two discharge switching devices Q3, Q4. Like the switching devices Q1, Q2, the discharge switching devices Q3, Q4 are MOSFETs. However, this disclosure is not limited thereto.

The resistance R9 is connected between the AC line 207b and the low voltage side line $V_{DCL}$. The discharge switching device Q3 is arranged at a part closer to the low voltage side line $V_{DCL}$ than the resistance R9. The resistance R10 is connected between the AC line 207b and the low voltage side line $V_{DCL}$. The discharge switching device Q4 is arranged at a part closer to the low voltage side line $V_{DCL}$ than the resistance R10. The resistance R9 and the discharge switching device Q3 configure a first discharge unit that is a discharge path from the AC line 207b, and connect the AC line 207b and the low voltage side line $V_{DCL}$. Also, the resistance R10 and the discharge switching device Q4 configure a second discharge unit that is a discharge path from the AC line 207a, and connect the AC line 207a and the low voltage side line $V_{DCL}$.

A control terminal (which is an example of a driving voltage supply terminal of the first discharge unit) of the discharge switching device Q3 is connected with one end of output terminals (source/drain) of the switching device Q1 via the charge unit 204. A control terminal (which is an example of a driving voltage supply terminal of the second discharge unit) of the discharge switching device Q4 is connected with one end of output terminals (source/drain) of the switching device Q2 via the charge unit 204. The terminal of the output terminals of the switching devices Q1, Q2, which is not connected to the discharge unit 205, is connected to the low voltage side line $V_{DCL}$.

The charge unit 204 has resistances R5 to R8, resistances R11, R12 and capacitors C3, C4.

One end of the resistance R11 is connected to the high voltage side output terminal 208H via the high voltage side line $V_{DCH}$. Three paths are connected between an end of the ends of the resistance R11, which is opposite to the end connected to the high voltage side output terminal 208H, and the low voltage side line $V_{DCL}$. That is, the three paths include a path, in which the resistances R5, R6 and the capacitor C3 are connected in series in close order to the resistance R11, a path in which the resistances R7, R8 and the capacitor C4 are connected in series in close order to the resistance R11 and a path having the resistance R12 only. The three paths are connected in parallel.

One terminal of the output terminals of the switching device Q1 and the control terminal of the discharge switching device Q3 are connected at a part between the resistance R7 and the resistance R8 in the charge unit 204. Also, one terminal of the output terminals of the switching device Q2 and the control terminal of the discharge switching device Q4 are connected at a part between the resistance R5 and the resistance R6 in the charge unit 204.

[Operation of Remaining Charge Discharge Unit 201]

The charge unit 204 supplies the driving voltage to the control terminal of the discharge switching device Q3 or control terminal of the discharge switching device Q4, depending on whether the switching device Q1 is on or off and whether the switching device Q2 is on or off. In other words, the charge unit 204 supplies the driving voltage when a predetermined control signal is transmitted from the switching devices Q1, Q2 depending on whether the switching devices Q1, Q2 are on or off. The driving voltage is supplied, based on the charges of the high voltage side line $V_{DCH}$, i.e., the charges of the high voltage side output terminal 208H or the charges of the smoothing capacitor C2.

When the AC interruption occurs in the AC line 207a, the switching device Q1 enables the charge unit 204 to supply the driving voltage to the control terminal of the discharge switching device Q3. That is, when the AC interruption does not occur in the AC line 207a, the switching device Q1 is under on-state. At this time, the control terminal of the discharge switching device Q3 is connected to the low voltage side line $V_{DCL}$ via the switching device Q1. When the AC interruption occurs in the AC line 207a, the switching device Q1 becomes off. At this time, the control terminal of the discharge switching device Q3 is disconnected from the low voltage side line $V_{DCL}$ and the driving voltage is supplied from the high voltage side line $V_{DCH}$ through the resistances R11, R7. Like this, as the state of the switching device Q1 is changed (as the predetermined control signal is transmitted to the charge unit 204), the voltage of the control terminal of the discharge switching device Q3 is changed.

When the AC interruption occurs in the AC line 207b, the switching device Q2 enables the charge unit 204 to supply the driving voltage to the control terminal of the discharge switching device Q4. That is, when the AC interruption does not occur in the AC line 207b, the switching device Q2 is under on-state. At this time, the control terminal of the discharge switching device Q4 is connected to the low voltage side line $V_{DCL}$ via the switching device Q2. When the AC interruption occurs in the AC line 207b, the switching device Q2 becomes off. At this time, the control terminal of the discharge switching device Q4 is disconnected from the low voltage side line $V_{DCL}$ and the driving voltage is supplied from the high voltage side line $V_{DCH}$ through the resistances R11, R5. Like this, as the state of the switching device Q2 is changed (as the predetermined control signal is transmitted to the charge unit 204), the voltage of the control terminal of the discharge switching device Q4 is changed.

When the detection unit 202 detects that the AC is input to both the AC lines 207a, 207b, i.e., when the AC interruption is not detected, both the switching devices Q1, Q2 become on. As described above, when the switching device Q1 and the switching device Q2 are under on-state, the supply of the driving voltage from the charge unit 204 to the discharge unit 205 is stopped. Therefore, at this time, both the discharge switching devices Q3, Q4 are under off-state and two discharge paths of the discharge unit 205 are kept under open state. In this case, accordingly, the charges are not moved from the AC lines 207a, 207b to the low voltage side line $V_{DCL}$.

When the detection unit 202 detects that the AC is interrupted in one of the AC lines 207a, 207b or both the AC lines, the switching devices Q1, Q2 corresponding to the interrupted AC lines 207a, 207b become off. When one or both the switching devices Q1, Q2 become off, the charge unit 204 is enabled to supply the driving voltage to the discharge unit 205, as described above.

Here, when the AC line 207a is interrupted, the switching device Q1 becomes off, the driving voltage is supplied to the control terminal of the discharge switching device Q3 configuring the first discharge unit and the discharge switching device Q3 becomes on. Thereby, the AC line 207b different from the interrupted AC line 207a and the low voltage side line $V_{DCL}$ are connected to each other via the resistance R9 and the discharge switching device Q3. Accordingly, the charges remaining in the filter capacitor C1 are discharged from the AC line 207b.

In the meantime, when the AC line 207b is interrupted, the switching device Q2 becomes off, the driving voltage is supplied to the control terminal of the discharge switching device Q4 configuring the second discharge unit and the discharge switching device Q4 becomes on. Thereby, the AC line 207a different from the interrupted AC line 207b and the low voltage side line $V_{DCL}$ are connected to each other via the resistance R10 and the discharge switching device Q4. Accordingly, the charges remaining in the filter capacitor C1 are discharged from the AC line 207a.

Figure 3:
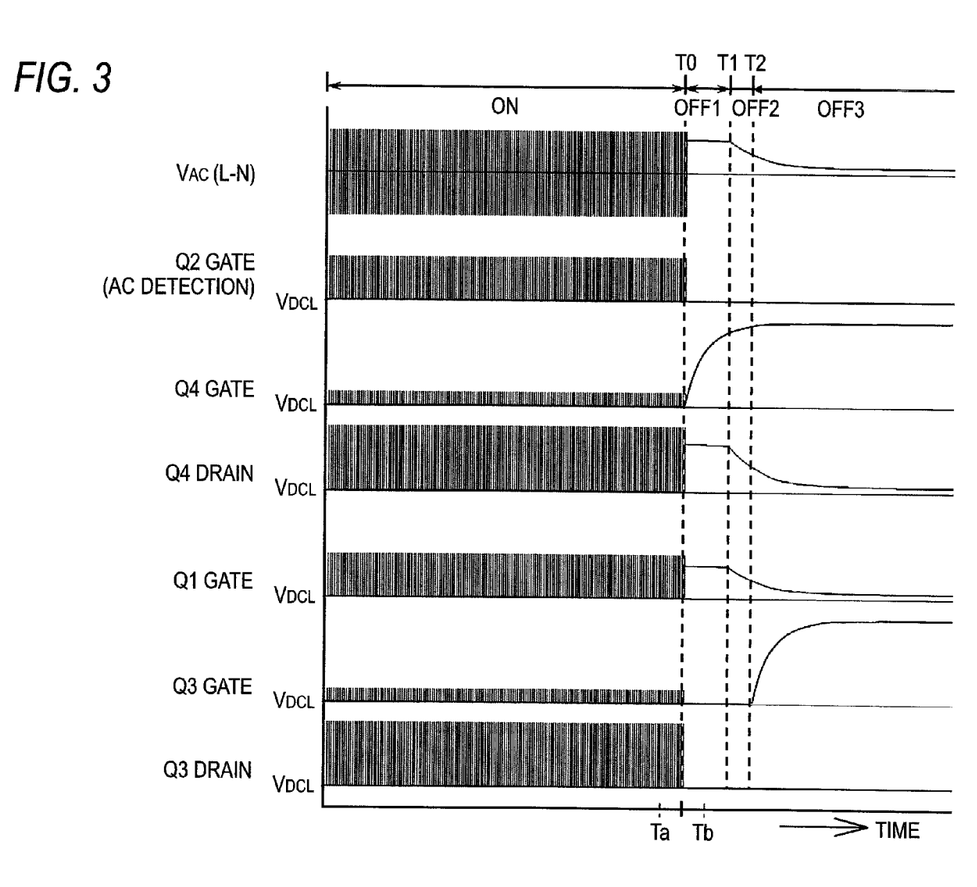
FIG. 3 illustrates operations of respective units of the power supply circuit when AC is interrupted in the power supply circuit.

FIG. 3 illustrates operations of respective units of the power supply circuit 1 when the AC is interrupted in the power supply circuit 1.

Figure 4:
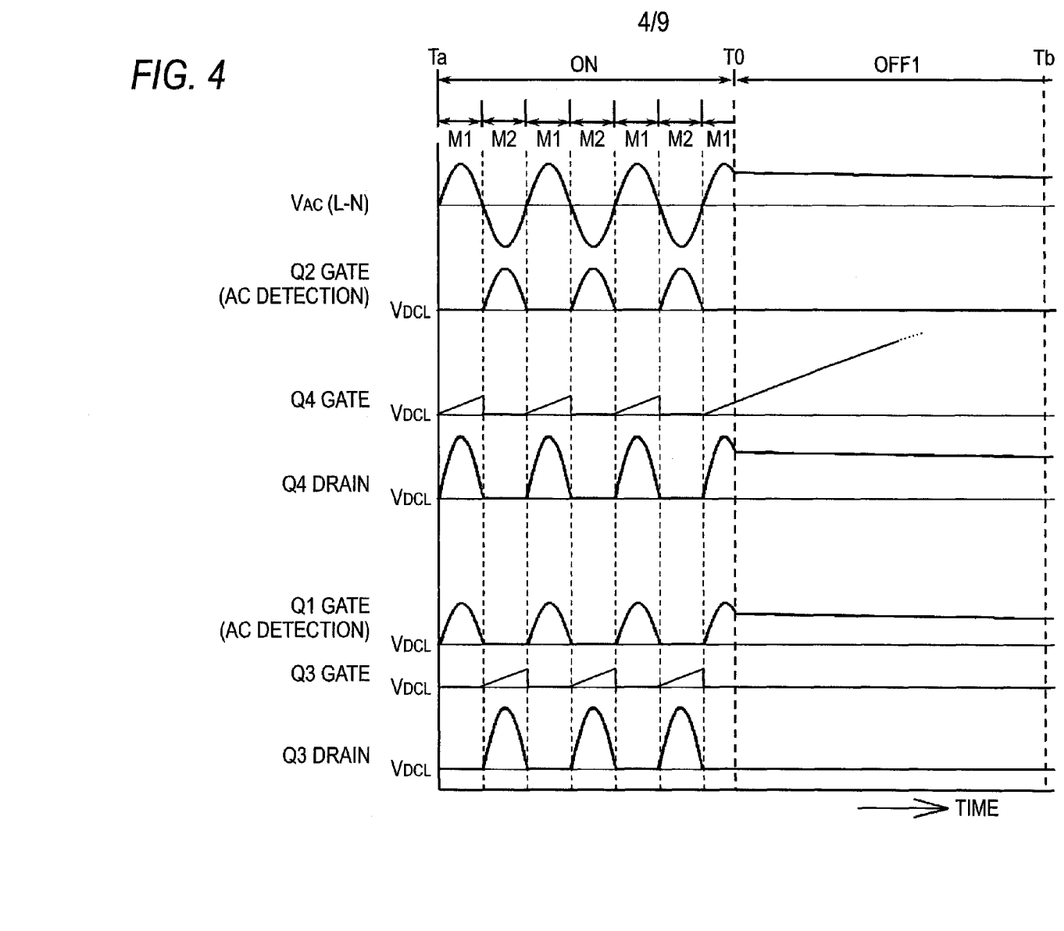
FIG. 4 is an enlarged view illustrating an adjacency of time T0 of FIG. 3.

FIG. 4 is an enlarged view illustrating an adjacency of time T0 of FIG. 3.

In the below, the operations of the switching devices Q1 to Q4, which are performed when the AC interruption in the AC line 207b (second output terminal N) is detected, are described with reference to FIGS. 3 and 4.

In FIGS. 3 and 4, a time, at which the AC is interrupted, is indicated by time T0. The time T0 is to be a reference time of a request value in IEC60065-9.1.6, IEC60950-2.1.1.7 and the like, for example. In FIG. 3, in corresponding order from the upper part, a waveform of the AC power supply $V_{AC}$, a waveform (Q2 GATE) of the control terminal of the switching device Q2, waveforms (Q4 GATE, Q4 DRAIN) of the control terminal and output terminal of the discharge switching device Q4, a waveform (Q1 GATE) of the control terminal of the switching device Q1 and waveforms (Q3 GATE, Q3 DRAIN) of the control terminal and output terminal of the discharge switching device Q3 are shown.

At time T0, when the AC is interrupted in the AC line 207b (when the AC is interrupted in Mode 1), the detection voltage of the AC line 207b becomes 0V and the switching device Q2 becomes off-state from on-state.

When the switching device Q2 becomes off, a charge starts from the high voltage side line $V_{DCH}$ to the control terminal of the discharge switching device Q4. Thereby, the voltage of the control terminal (gate voltage) is increased.

When time elapses from time T0 and reaches time T1, the gate voltage of the discharge switching device Q4 exceeds a threshold and the discharge switching device Q4 becomes on from off-state. When the discharge switching device Q4 becomes on, the remaining charges in the filter capacitor C1 are discharged from the AC line 207a to the low voltage side line $V_{DCL}$.

At this time, as the charges are discharged at the AC line 207a, the gate voltage of the switching device Q1 is dropped and the switching device Q1 becomes off (time T2 after time T1). Thereby, the gate voltage of the discharge switching device Q3 is increased and the discharge switching device Q3 becomes on. At this time, however, the discharge switching device Q3 does not contribute to the discharge of the charges.

[Effects of First Illustrative Embodiment]

As described above, according to the first illustrative embodiment, when the AC is being input, i.e., when the power supply circuit 1 normally operates, the remaining charge discharge unit 201 is configured so that the power loss is suppressed and thus the power to be consumed is relatively small. Therefore, it is possible to realize the power supply circuit 1 satisfying a variety of request values and capable of operating in high efficiency. In the power supply circuit 1, it is possible to positively secure the operation reliability against the foreign noises of the normal mode such as lighting surge.

The power supply circuit 1 drives the remaining charge discharge unit 201 having a simple configuration by using the smoothing capacitor C2. Since the power supply circuit 1 is configured by using the relatively small amount of the parts, it is possible to reduce the manufacturing cost of the power supply circuit 1.

Also, in this illustrative embodiment, the power supply circuit 1 can be applied to a rectification method in which a bridge diode is not provided. In the power supply circuit 1 of this illustrative embodiment, the remaining charge discharge unit 201 using the switching devices is provided. Accordingly, even though many charges remain in the filter capacitor C1, it is possible to rapidly discharge the remaining charges when the AC is interrupted.

[Second Illustrative Embodiment]

Since the basic configuration of the power supply circuit of a second illustrative embodiment is the same as that of the power supply circuit of the first illustrative embodiment, the descriptions thereof will be omitted. Meanwhile, in the second illustrative embodiment, the configurations of the charge unit and the discharge unit are different from those of the first illustrative embodiment.

Figure 5:
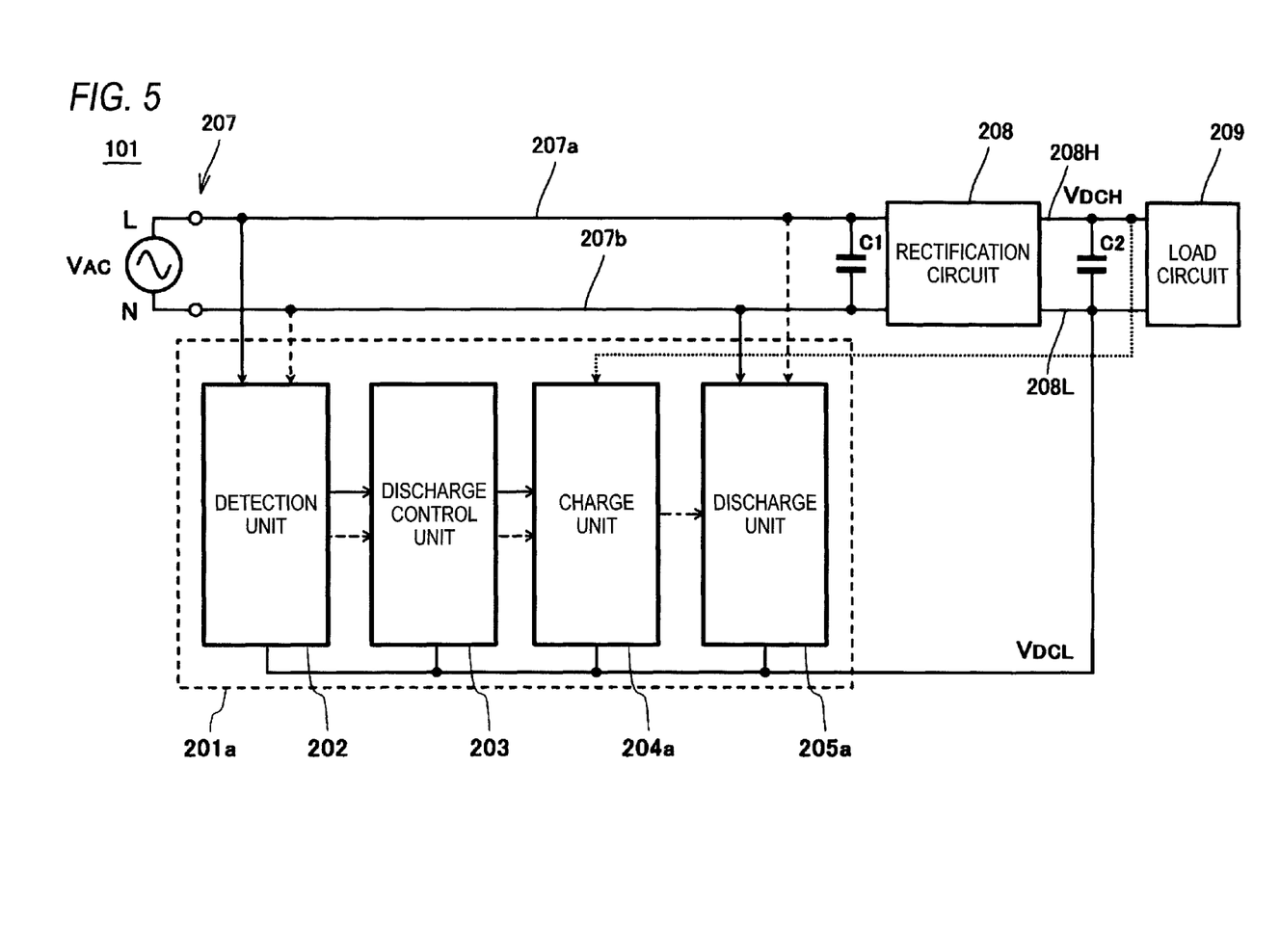
FIG. 5 is a circuit diagram illustrating a configuration of a power supply circuit according to a second illustrative embodiment.

FIG. 5 is a circuit diagram illustrating a configuration of a power supply circuit according to the second illustrative embodiment.

As shown in FIG. 5, a power supply circuit 101 includes a remaining charge discharge unit 201a having a charge unit 204a and a discharge unit 205a having configurations different from the remaining charge discharge unit 201 of the first illustrative embodiment. According to the second illustrative embodiment, in the discharge unit 205a, a path from the AC line 207a and a path from the AC line 207b are connected by a logical add. In the discharge unit 205a, one switching device is used to discharge the remaining charges in the filter capacitor C1 when the AC is interrupted. In the charge unit 204a, after the control signals from the switching devices Q1, Q2 are synthesized, the driving voltage is supplied to the control terminal of the switching device of the discharge unit 205a through one path.

Figure 6:
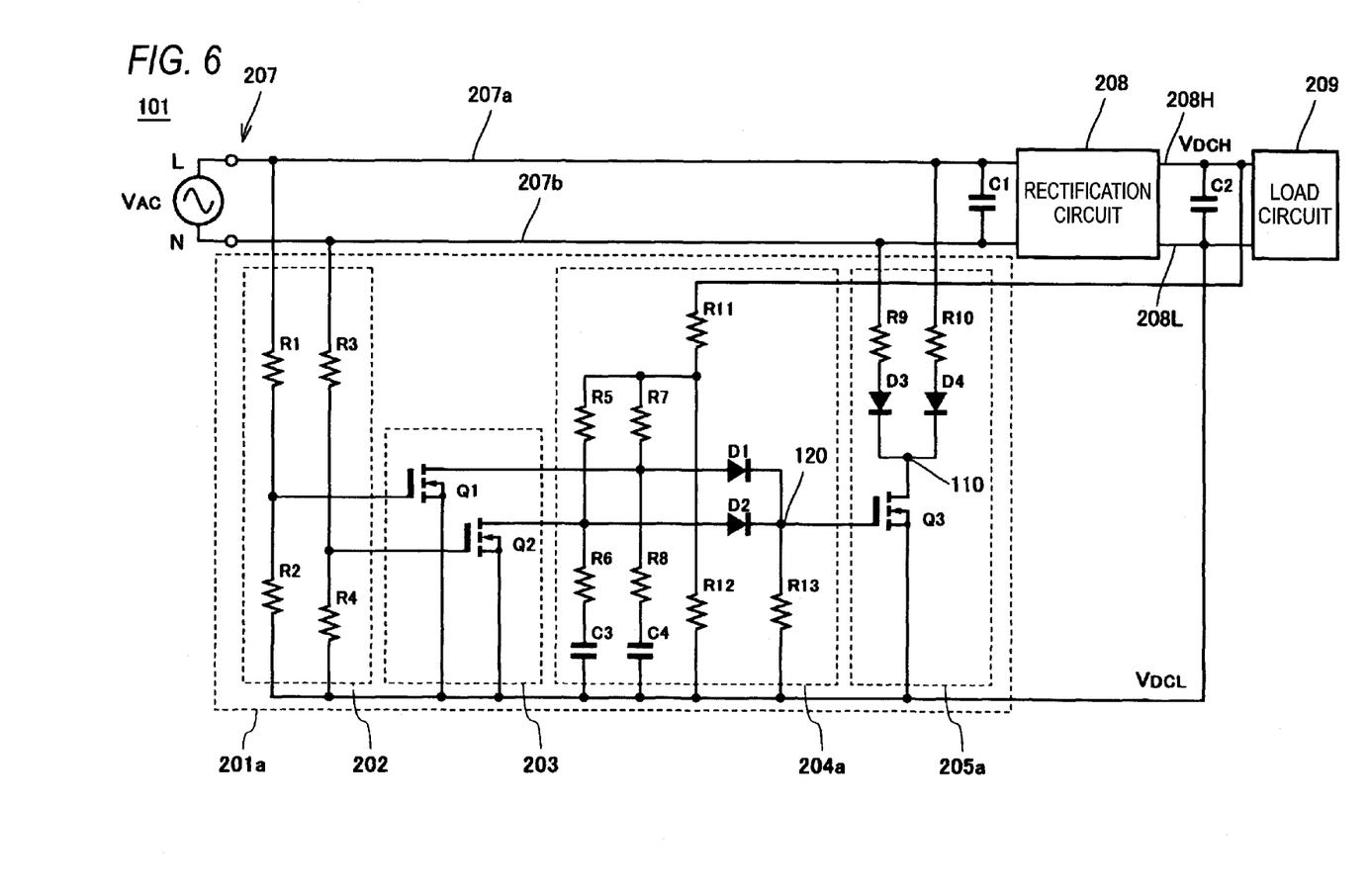
FIG. 6 is a circuit diagram illustrating a detailed configuration of the power supply circuit according to the second illustrative embodiment.

FIG. 6 is a circuit diagram illustrating a detailed configuration of the power supply circuit 101 according to the second illustrative embodiment.

As shown in FIG. 6, the discharge unit 205a is provided with the resistance R9 and a diode D3 connected to the AC line 207b, the resistance R10 and a diode D4 connected to the AC line 207a and the discharge switching device Q3 (which is an example a third discharge unit). The diode D3 is connected to the resistance R9 in series. The diode D4 is connected to the resistance R10 in series. The diodes D3, D4 are arranged so that the low voltage side line $V_{DCL}$ becomes a forward direction. The diodes D3, D4 have cathodes that are connected to each other at a connection point 110. That is, the two discharge paths from the AC lines 207a, 207b configured by the resistances R9, R10 and the diodes D3, D4 are connected and integrated at the connection point 110 (which is an example of a discharge synthesis part).

The discharge switching device Q3 is connected between the connection point 110 and the low voltage side line $V_{DCL}$.

The charge unit 204a is configured by further adding diodes D1, D2 and a resistance R13 with respect to the charge unit 204 of the first illustrative embodiment. That is, in the second illustrative embodiment, one terminal of the output terminals of the switching device Q1 and one terminal of the output terminals of the switching device Q2 are connected to each other at a connection point 120. The diode D1 is arranged between the connection point 120 and the resistance R7 so that the connection point 120 becomes a forward direction. Also, the diode D2 is arranged between the connection point 120 and the resistance R5 so that the connection point 120 becomes a forward direction. In other words, anodes of the diodes D1, D2 are respectively connected to the connection point of the resistance R5 and the resistance R6 and the connection point of the resistance R7 and the resistance R8. Cathodes of the diodes D1, D2 are connected at the connection point 120. The connection point 120 is connected to the low voltage side line $V_{DCL}$ via the resistance R13. Also, the connection point 120 is connected to the control terminal (driving voltage supply terminal) of the discharge switching device Q3, as one terminal of the common output terminals of the switching devices Q1, Q2.

In the second illustrative embodiment, the outputs of the output terminals of the switching device Q1 and the switching device Q2 are synthesized at the connection point 120. That is, when one of the switching device Q1 and the switching device Q2 becomes off, the driving voltage is supplied to the discharge switching device Q3. When the driving voltage is supplied from the charge unit 204a in accordance with the operation of the switching device Q1 or switching device Q2, the discharge switching device Q3 becomes on. When the discharge switching device Q3 becomes on, the low voltage side line $V_{DCL}$ is connected to each of the AC line 207a and the AC line 207b. Thereby, the charges remaining in the filter capacitor C1 are discharged from one of the AC lines 207a, 207b, in which the AC is not interrupted.

[Effects of Second Illustrative Embodiment]

As described above, the same effects as the first illustrative embodiment are also obtained in the second illustrative embodiment. Also, the discharge unit 205a of the power supply circuit 101 does not include the discharge switching device Q4 that has been included in the discharge unit 205 of the first illustrative embodiment. That is, in the second illustrative embodiment, the discharge unit 205a may be provided with one discharge switching device Q3, so that it is possible to reduce the manufacturing cost of the power supply circuit 101.

[Third Illustrative Embodiment]

Since the basic configuration of the power supply circuit of a third illustrative embodiment is the same as that of the power supply circuit of the second illustrative embodiment, the descriptions thereof will be omitted. Meanwhile, in the third illustrative embodiment, the configurations of the detection unit, the discharge control unit and the charge unit are different from those of the second illustrative embodiment.

Figure 7:
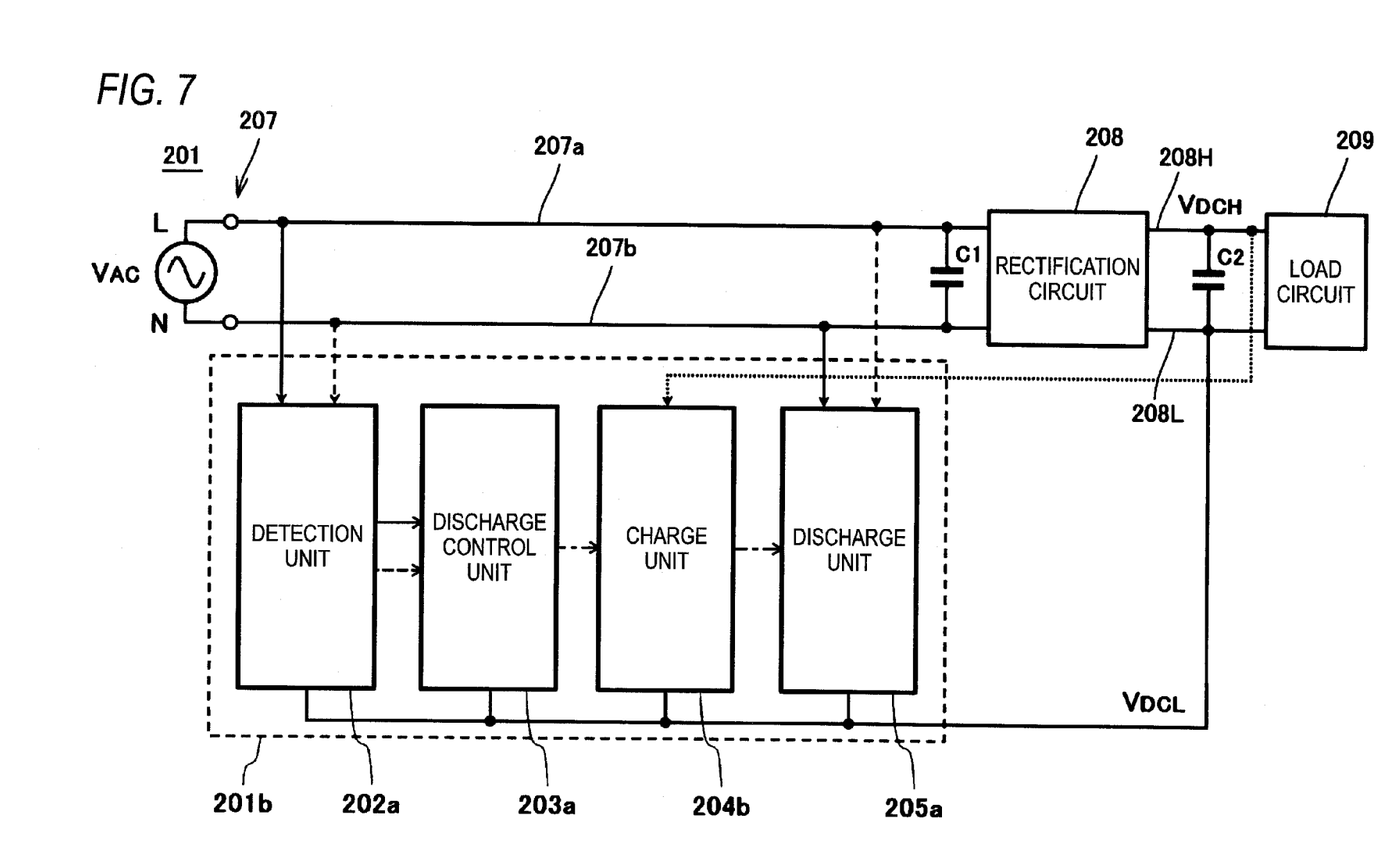
FIG. 7 is a circuit diagram illustrating a configuration of a power supply circuit according to a third illustrative embodiment.

FIG. 7 is a circuit diagram illustrating a configuration of a power supply circuit according to the third illustrative embodiment.

As shown in FIG. 7, a power supply circuit 201 includes a remaining charge discharge unit 201b having a detection unit 202a, a discharge control unit 203a and a charge unit 204b having configurations different from the remaining charge discharge unit 201a of the second illustrative embodiment. According to the third illustrative embodiment, in the charge unit 204a, the switching device Q1 and the switching device Q2 are connected to each other in series and the outputs of the switching device Q1 and the switching device Q2 are connected to the charge unit 204a and the control terminal of the switching device Q3 via one path.

Figure 8:
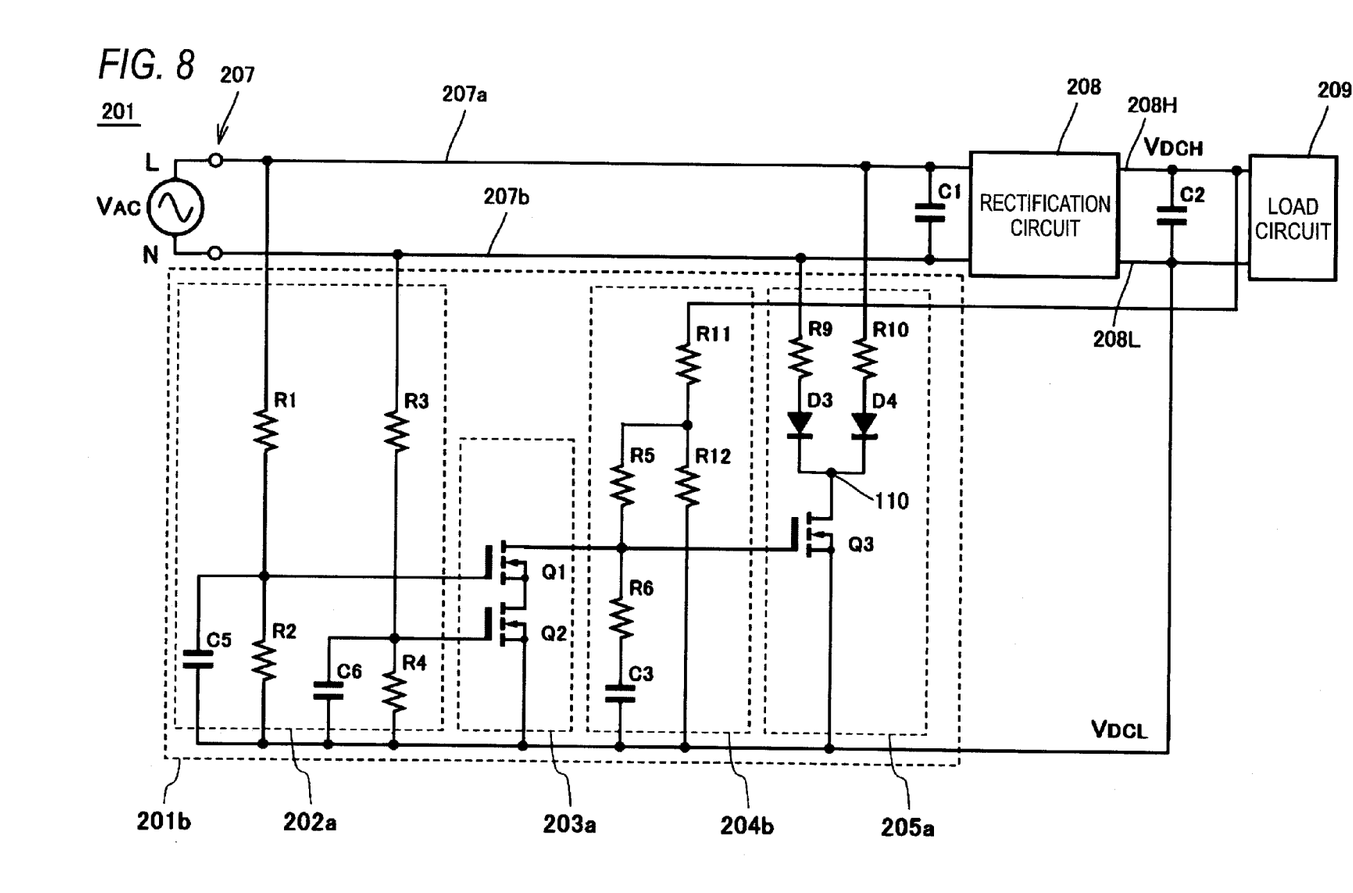
FIG. 8 is a circuit diagram illustrating a detailed configuration of the power supply circuit according to the third illustrative embodiment.

FIG. 8 is a circuit diagram illustrating a detailed configuration of the power supply circuit 201 according to the third illustrative embodiment.

As shown in FIG. 8, the detection unit 202a is different from the detection unit 202 of the second illustrative embodiment, in that a capacitor C5 is provided in parallel with the resistance R2 and a capacitor C6 is provided in parallel with the resistance R4. The capacitors C5, C6 provide the detection unit 202a with a time constant. When the AC is input and thus the power supply circuit 201 normally operates, the switching devices Q1, Q2 are kept under on-state.

According to the third illustrative embodiment, in the discharge control unit 203a, the switching device Q2 and the switching device Q1 are connected in series in close order to the low voltage side line $V_{DCL}$. In other words, one terminal (drain) of the output terminals of the switching device Q1 is connected to the discharge switching device Q3, and the other terminal (source) is connected to one terminal (drain) of the output terminals of the switching device Q2. A terminal (source) of the output terminals of the switching device Q2, which is not connected to the switching device Q1, is connected to the low voltage side line $V_{DCL}$. Thereby, when the detection unit 202a detects the AC of both the AC lines 207a, 207b, the discharge control unit 203a outputs a synthesis detection signal. That is, one terminal of the output terminals of the switching device Q1 is connected to the low voltage side line $V_{DCL}$.

The charge unit 204b is different from the charge unit 204 of the first illustrative embodiment, in that the resistances R7, R8 and the capacitor C4 are not included. That is, the charge unit 204a has, as a path connecting between the resistance R11 and the low voltage side line $V_{DCL}$, only one path having the resistances R5, R6 and the capacitor C3 in addition to the path having the resistance R12.

One terminal of the output terminals of the switching device Q1 is connected to a point between the resistance R5 and the resistance R6 and is connected to the control terminal of the discharge switching device Q3.

In the third illustrative embodiment, when the AC is not interrupted in the AC lines 207a, 207b, both the switching devices Q1, Q2 become on, so that the discharge switching device Q3 is kept under off-state. When the AC interruption in one of the AC lines 207a, 207b is detected and one of the switching devices Q1, Q2 becomes off, the driving voltage is supplied to the control terminal of the discharge switching device Q3. When the gate voltage of the discharge switching device Q3 exceeds a threshold, the discharge switching device Q3 becomes on-state from the off-state and the remaining charges in the filter capacitor C1 are discharged.

[Effects of Third Illustrative Embodiment]

As described above, the same effects as the first illustrative embodiment are also obtained in the third illustrative embodiment. Also, the discharge unit 205a does not include the discharge switching device Q4 that has been included in the discharge unit 205 of the first illustrative embodiment.

Accordingly, like the second illustrative embodiment, it is possible to reduce the manufacturing cost of the power supply circuit 201.

Also, in the power supply circuit 201, since the switching device Q1 and the switching device Q2 included in the discharge control unit 203a are connected in series, the path in parallel with the resistance R12 of the charge unit 204b can be made to be one system. Therefore, both the resistances R7, R8 and the capacitor C4 included in the charge unit 204 of the first illustrative embodiment and the diodes D1, D2 and the resistance R13 included in the charge unit 204a of the second illustrative embodiment are not necessary in the charge unit 204b. Hence, it is possible to further reduce the manufacturing cost of the power supply circuit 201.

In the meantime, the switching device Q1 and the switching device Q2 may be connected in series in opposite order to the above-described order.

[Others]

The switching devices Q1, Q2, the discharge switching devices Q3, Q4 and the like may be configured by relay devices.

When the AC is interrupted in the AC lines 207a, 207b, the switching devices Q1, Q2 may be configured to become on-state and the driving voltage may be supplied to the control terminals of the discharge switching devices Q3, Q4, and the like.

The low voltage side line $V_{DCL}$ may be connected to a ground potential, for example. In this case, the low voltage side line $V_{DCL}$ connects the low voltage side output terminal 208L to the ground potential.

The power supply circuit may have, as the noise suppression circuit for suppressing noises, a circuit using the other circuit devices (for example, inductor and the like) in addition to the line capacitor. That is, the power supply circuit is not limited to the circuit having only the line capacitor for suppressing noises and may have various noise suppression units including the line capacitor.

The illustrative embodiments are just exemplary and should not be construed to limit this disclosure. The scope of this disclosure is indicated by the claims and includes all modifications and equivalents.

What is claimed is:

1. A power supply circuit comprising:
   an input part, which has a first input terminal and a second input terminal, and which is configured to connect to an alternating current power supply;
   a line capacitor that is connected to the first input terminal and the second input terminal in parallel with the alternating current power supply;
   a rectification circuit, which is connected to the first input terminal and the second input terminal, which rectifies alternating current of the alternating current power supply and outputs to a load circuit from a high voltage side output terminal and a low voltage side output terminal;
   a smoothing capacitor, which is connected between the high voltage side output terminal and the low voltage side output terminal, which charges electrical charges output from the rectification circuit, and which discharges the electrical charges to the load circuit; and
   a remaining charge discharge unit that, when the alternating current flowing to the rectification circuit is interrupted in one of the first input terminal and the second input terminal, detects the interruption and discharges electrical charges remaining in the line capacitor to the low voltage side output terminal from the other one of the first input terminal and the second input terminal, which is different from the interrupted output terminal, based on charges of the high voltage side output terminal or electrical charges of the smoothing capacitor.

2. The power supply circuit according to claim 1, wherein the remaining charge discharge unit comprises:
   a detection unit, which is connected between the first and second input terminals and the low voltage side line, and which detects the interruption;
   a discharge unit, which is connected between the first and second input terminals and the low voltage side line;
   a charge unit, which supplies a driving voltage from the high voltage side output terminal to the discharge unit; and
   a discharge control unit, which controls the supply of the driving voltage by the charge unit, based on a detection result of the interruption by the detection unit, and
   wherein the discharge unit, which discharges the electrical charges remaining in the line capacitor, based on the driving voltage supplied from the charge unit.

3. The power supply circuit according to claim 2, wherein the detection unit comprises:
   a first detection unit, which is connected between the first input terminal and the low voltage side line, and which detects the interruption in the first input terminal based on a potential of the low voltage side line; and
   a second detection unit, which is connected between the second input terminal and the low voltage side line, and which detects the interruption in the second input terminal based on a potential of the low voltage side line,
   wherein the discharge control unit comprises:
   a first switching device that has a control terminal connected to the first detection unit and becomes on or off state, depending on the detection result of the interruption in the first input terminal by the detection unit; and
   a second switching device that has a control terminal connected to the second detection unit and becomes on or off state, depending on the detection result of the interruption in the second input terminal by the detection unit,
   wherein when both the first switching device and the second switching device are under on-state, the supply of the driving voltage from the charge unit to the discharge unit is stopped, and
   wherein when one or both the first switching device and the second switching device are off-state, the driving voltage is supplied from the charge unit to the discharge unit.

4. The power supply circuit according to claim 3,
   wherein the discharge unit has a first discharge unit that is connected between the second input terminal and the low voltage side line and a second discharge unit that is connected between the first input terminal and the low voltage side line,
   wherein one terminal of output terminals of the first switching device is connected to a driving voltage supply terminal of the first discharge unit,
   wherein one terminal of output terminals of the second switching device is connected to a driving voltage supply terminal of the second discharge unit,
   wherein the first discharge unit discharges the electrical charges remaining in the line capacitor from the second input terminal when the driving voltage is supplied from the charge unit to the driving voltage supply terminal of the first discharge unit depending on an operation of the first switching device, and
   wherein the second discharge unit discharges the electrical charges remaining in the line capacitor from the first input terminal when the driving voltage is supplied from the charge unit to the driving voltage supply terminal of the second discharge unit depending on an operation of switching device.

5. The power supply circuit according to claim 3, wherein the discharge unit includes:
a discharge synthesis unit, which is connected to the first input terminal and the second input terminal, and which connects a path from the first input terminal and a path from the second input terminal; and
a third discharge unit, which is connected between the discharge synthesis unit and the low voltage side line, and
wherein the third discharge unit discharges the electrical charges remaining in the line capacitor from the first and second input terminals, in which the alternating current is not interrupted, through the discharge synthesis unit when the driving voltage is supplied to a driving voltage supply terminal of the third discharge unit from the charge unit as the first switch or second switch operates.

6. The power supply circuit according to claim 5, wherein one terminal of output terminals of the first switching device and one terminal of output terminals of the second switching device are connected to each other at a connection part, and
wherein the connection part is connected to the driving voltage supply terminal of the third discharge unit.

7. The power supply circuit according to claim 5, wherein the first switching device and the second switching device are connected to each other in series, and
wherein one terminal of output terminals of one of the first switching device and the second switching device is connected to the driving voltage supply terminal of the third discharge unit.

* * * * *